Patented Jan. 22, 1946

2,393,495

UNITED STATES PATENT OFFICE 2,393,495

COATING COMPOSITION

William E. Tann, Akron, Ohio, assignor to The Firestone Tire & Rubber Company, Akron, Ohio, a corporation of Ohio No Drawing. Application September 10, 1942, Serial No. 457,879

1 Claim. (Cl. 260—32)

This invention relates to coating compositions and relates more especially to protective coating compositions which include an oil- and sun-resisting synthetic rubber.

Polymerized chlorobutadiene, commonly known as polychloroprene, is a type of synthetic rubber which is very resistant to attack by gasoline and other petroleum products and is also not subject to marked deterioration when exposed to heat and/or sunlight. In these respects neoprene is notably superior to natural rubber.

Polychloroprene has completely replaced natural rubber in only a few specialized articles. To a large extent this is true because of the higher cost of polychloroprene and the greater difficulty of fabricating articles from polychloroprene compositions. Many of the advantages of polychloroprene articles could be approximated by providing the exposed surface of a natural rubber article with a thin veneer or coating of a polychloroprene composition. This end could be accomplished by using a neoprene coating composition which is easily prepared and which, on application to the surface of a rubber article, leaves a polychloroprene film which is strongly adherent to the rubber surface. However, polychloroprene is not soluble in a common rubber solvent such as gasoline, and a polychloroprene film deposited on a natural rubber surface from a known type of polychloroprene solution or dispersion does not adhere well to the rubber and can easily be stripped off.

It is, therefore, a primary object of the invention to provide a polychloroprene protective coating composition suitable for application to a surface of an article made from natural rubber or an equivalent material.

Another object is to provide a polychloroprene coating composition which may be quickly and conveniently prepared.

Further objects will be manifest in the description of the invention which follows.

It has been found that a polychloroprene coating composition can be readily prepared by dispersing a suitable polychloroprene composition in an organic ester solvent of the class defined by the formula RCOOR', wherein R is hydrogen or an alkyl radical and R' is an alkyl or a substituted alkyl radical. Preferably, an ester is chosen which contains from about five to about twelve carbon atoms in the molecule, and those esters coming within the lower end of this range are generally more satisfactory in that they are more volatile. It has also been found that the polychloroprene ester dispersion may be thinned with a more volatile ester, such as ethyl acetate, or with gasoline or solvent naphtha without precipitating the polychloroprene, even though polychloroprene cannot be directly dispersed in ethyl acetate or gasoline.

Broadly, the invention comprises a polychloroprene coating composition or paint which includes an organic ester solvent of the above-mentioned class. The coating composition is characterized in its tolerance to thinning by the addition of a non-solvent for polychloroprene, such as ethyl acetate or a petroleum hydrocarbon solvent, such as gasoline, without any precipitation of the polychloroprene. The coating composition is further characterized by the fact that the polychloroprene composition film remaining on the surface of a natural rubber article, after application of the coating composition thereto, adheres strongly to such surface and cannot readily be stripped off.

Examples of ester solvents preferred are butyl formate, ethyl butyrate, butyl acetate, a hexyl acetate, such as methyl amyl acetate, benzyl acetate, an octyl acetate, chloro-propyl acetate and diethylene glycol monobutyl ether acetate. In addition to serving as solvents for the polychloroprene, certain of the higher boiling esters mentioned may act as plasticizers for the polychloroprene composition. Other esters suitable as plasticizers are butyl benzoate and triethylene glycol di-2-ethyl butyrate.

The following examples illustrate certain specific embodiments of the invention.

Example 1

A black sidewall paint for natural rubber tires and the like was made by first preparing the following polychloroprene composition:

| | |
|---|---:|
| Polychloroprene | 65.0 |
| Hexamethylene imidonium hexamethylene dithiocarbamate | 0.3 |
| Dibenzothiazyl disulfide | 0.5 |
| Phenyl-beta-naphthylamine | 0.7 |
| Stearic acid | 0.7 |
| Cottonseed oil | 1.5 |
| Carbon black | 25.5 |
| Magnesium oxide | 2.8 |
| Zinc oxide | 3.0 |
| | 100.0 |

Fifty pounds of the polychloroprene composition were placed in 32 gallons of butyl acetate and allowed to absorb some of the ester and swell. A smooth dispersion was readily produced by stirring the mixture. The dispersion was thinned to a smooth paint by mixing it with 16 gallons of solvent naphtha and 9 gallons of gasoline containing 2.5 pounds of ester gum as a further plasticizer. About 60 gallons of the black sidewall paint were obtained.

On application of this paint to the black sidewall of a conventional pneumatic tire, a glossy black surface film of the polychloroprene composition was provided thereon. This film gradually cured in the air, because of the presence of curing ingredients and accelerators therein, and adhered tenaciously to the tire sidewall, affording it excellent protection against sun-checking and weakening due to contamination by oils or greases.

Application of such paint to the tread grooves of the tire protects them from the deteriorating action of any oil or grease with which the tire may come in contact. The paint may be applied to the surface of any natural rubber, or equivalent article in order to protect the article from the sun, ozone, or petroleum products.

*Example 2*

A polychloroprene composition is placed in butyl formate, allowed to swell therein, and then the mixture is stirred. A smooth dispersion is thereby produced containing 36 per cent solids content, in less time than is required according to Example 1. The butyl formate dispersion so produced may then be thinned by mixing with three volumes of gasoline to produce a stable paint which is strongly adherent to another surface, such as vulcanized or unvulcanized natural rubber, and may serve to waterproof, oilproof and sunproof such surface. The gasoline may be replaced in whole or in part by carbon tetrachloride, trichloroethylene, or the like, for the production of non-inflammable paint.

The coating composition may contain one or more of the above ester plasticizers if an efficiently plasticized film is desired. The coating composition may also be used effectively to coat surfaces of other plastics and rubber-like materials, such as polyisobutylene plastics and copolymers of butadiene and isobutylene.

Modification may be resorted to and obvious equivalents substituted for the specific ingredients herein disclosed without departing from the scope and spirit of the invention.

I claim:

A coating composition comprising substantially a 36 per cent butyl formate dispersion of polychloroprene, said dispersion being diluted with gasoline to produce a stable coating composition strongly adherent to vulcanized and unvulcanized natural rubber.

WILLIAM E. TANN.